United States Patent [19]

Juliana, Jr. et al.

[11] 4,266,232

[45] May 5, 1981

[54] VOLTAGE MODULATED DROP-ON-DEMAND INK JET METHOD AND APPARATUS

[75] Inventors: Anthony Juliana, Jr.; Richard W. Koepcke, both of San Jose; Ross N. Mills; Frank E. Talke, both of Morgan Hill, all of Calif.

[73] Assignee: International Business Machines Corporation, Armonk, N.Y.

[21] Appl. No.: 53,468

[22] Filed: Jun. 29, 1979

[51] Int. Cl.$^3$ .............................................. G01D 15/18

[52] U.S. Cl. .............................................. 346/140 R

[58] Field of Search .................................... 346/140 R

[56] References Cited

U.S. PATENT DOCUMENTS

| | | | |
|---|---|---|---|
| 3,683,212 | 8/1972 | Zoltan | 346/140 PD X |
| 3,787,884 | 1/1974 | Demer | 346/140 PD X |
| 3,828,357 | 8/1974 | Koeblitz | 346/140 PD |
| 4,072,958 | 2/1978 | Hayami | 346/140 PD |

*Primary Examiner*—Joseph W. Hartary
*Attorney, Agent, or Firm*—Otto Schmid, Jr.

[57] ABSTRACT

A drop-on-demand ink jet printer in which the print head includes a cavity having a nozzle portion at one end and a transducer mounted to contract a wall portion of the cavity when energized by a suitable voltage drive pulse. The drive pulses are produced at a predetermined rate but at a selectively controlled amplitude in response to the print data. In cases where no drop is required to print the data, the drive pulse is at a lower amplitude than the threshold voltage level, and for the first drop to be formed following a time at which no drop was formed, the amplitude of the drive pulse is greater than the threshold voltage level. At steady state operation of producing drops in sequence, the amplitude of the drive pulses equals the threshold voltage level.

7 Claims, 8 Drawing Figures

VOLTAGE MODULATED DROP-ON-DEMAND INK JET METHOD AND APPARATUS

BACKGROUND OF THE INVENTION

This invention relates to a printer method and system which utilizes means for generating ink droplets on demand under control of a suitable character generating apparatus.

Ink jet printing has been known in the prior art including systems which use a pressure generated continuous stream of ink which is broken into individual drops by a continuously energized transducer. The individual drops are selectively charged and deflected either to the print medium for printing or to a sump where the drops are collected and recirculated. Examples of these pressurized systems include U.S. Pat. Nos. 3,596,275 to Sweet, and 3,373,437 to Sweet et al. There have also been known in the prior art ink jet printing systems in which a transducer is used to generate ink drops on demand. One example of such a system is commonly assigned U.S. Pat. No. 3,787,884 to Demer. In this system the ink is supplied to a cavity by gravity flow and a transducer mounted in the back of the cavity produces motion, when energized by an appropriate voltage pulse, which results in the generation of an ink droplet. A different embodiment of a drop-on-demand system in which the transducer is radially arranged is shown in U.S. Pat. No. 3,683,212 to Zoltan. The prior art drop-on-demand printing systems have been limited by a low drop production rate and by a low jet stability which produced drops with irregular spacing and/or size which led to poor print quality.

SUMMARY OF THE INVENTION

It is therefore the object of this invention to produce an improved drop-on-demand printing system having a higher drop production rate.

It is another object of this invention to produce an improved drop-on-demand printing system in which drops are produced with uniform size and spacing.

These and other objects are accomplished according to the present invention by a drop-on-demand ink jet printing apparatus which provides a print head comprising a body member having a cavity supplied with ink by gravity flow. The cavity has a nozzle portion at one end and a wall portion. A selectively energizable transducer is mounted in physical communication with the wall portion so that, when energized by a suitable voltage pulse equal to or exceeding a predetermined threshold voltage amplitude, one drop of ink is ejected through the nozzle portion of the print head. The voltage drive pulses are generated at every one of predetermined equal intervals so that a predetermined drop production rate is established; and the amplitude is controlled so that the drive pulse is at an amplitude less than the threshold voltage amplitude when no drop is to be formed, at an amplitude greater than the threshold voltage amplitude for the first drop formed, following an interval at which no drop was formed.

In a specific embodiment described, the apparatus for controlling the amplitude of the drive pulses comprises means for storing the print data and for transferring the data a line at a time under control of a clock means and sequencing control logic to character generator means. The output from the character generator comprises a bit stream of data which is entered into shift register means. The shift register data is coupled in parallel to access, by well known table look-up techniques, from read only storage apparatus a digital word which defines the proper amplitude for the drive voltage for the next bit of that specific print data. This digital word is converted to analog form by a suitable digital-to-analog converter and utilized to control the amplitude for the next drive pulse. A further embodiment is shown in which the control means comprises a microcomputer programmed to produce, by table look-up techniques, a digital word which is converted and used as before to generate the appropriate drive amplitude for the pulses to transducer 24.

DESCRIPTION OF THE PREFERRED EMBODIMENTS

The present invention is described, by way of example, as embodied in the apparatus described in the above-mentioned Demer patent. However, the invention is applicable to other drop-on-demand printing systems as well.

Figure 1:
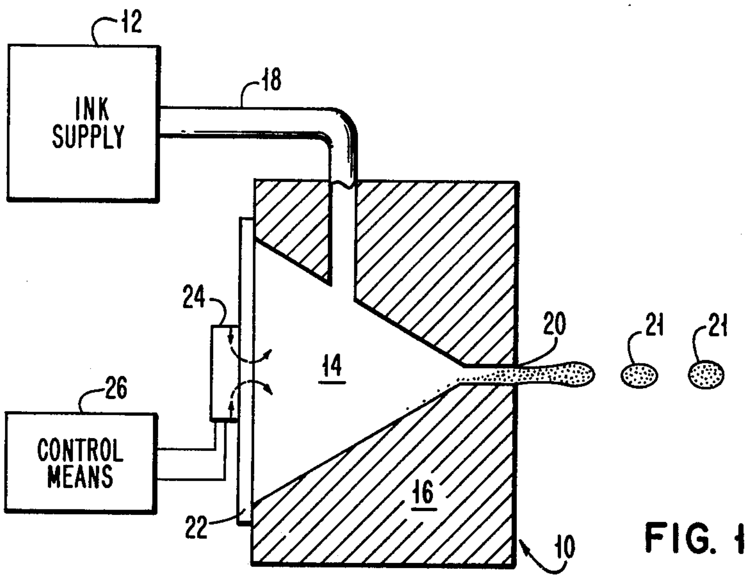
FIG. 1 is a schematic view partially in section of the drop-on-demand ink jet printer in accordance with the present invention.

Referring to FIG. 1 the printer apparatus comprises a print head 10 to which is supplied liquid ink by gravity flow from ink supply means 12. A cavity 14 is provided in head body 16 and this cavity 14 is maintained filled with ink through supply line 18 from supply means 12. An exit from cavity 14 is provided by nozzle portion 20 which is designed so that the ink does not flow out of nozzle portion 20 under static conditions. The left end of cavity 14 as shown in FIG. 1 is closed by a suitable membrane 22 which is fixed to the head body. Fastened to membrane 22 is an electromechanical transducer 24. Transducer 24 contracts radially when energized with a suitable voltage pulse and bends membrane 22 inwardly and decreases the volume of cavity 14 so that liquid is expelled out through nozzle portion 20 to form a single drop. Control means 26 provides the voltage control pulses to selectively energize transducer 24 to produce one ink drop for each voltage pulse applied to transducer 24.

According to the present invention the voltage pulses to selectively energized transducer 24 are formed at every one of predetermined equal intervals T so that a predetermined drop production rate is established by the repetition frequency of the voltage pulses. The pulses are modulated in amplitude in accordance not only whether or not a drop is to be produced during the present interval, but also in accordance with the drop production history of a chosen number of other drops as will be described in greater detail later.

During printing, print head 10 is traversed across the print medium at a constant velocity and character bit data is generated by control means 26, as will be described below in greater detail, in synchronism with the head movement so that drops can be formed at selected intervals T responsive to the character bit data to produce the desired print data on the print medium. The apparatus for providing the synchronized movement of print head 10 is known in the art and may comprise the head transport apparatus described in the above-mentioned Demer patent, for example.

Figure 2:
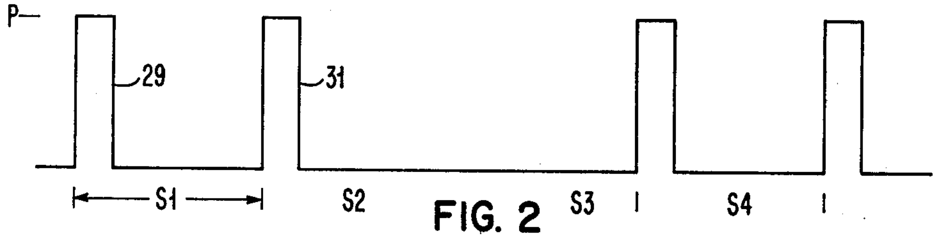
FIGS. 2, 3 and 4 are diagrams showing respectively the voltage driving pulses, the resulting meniscus motion and the drops produced for prior art drop-on-demand operation.
Figure 3:
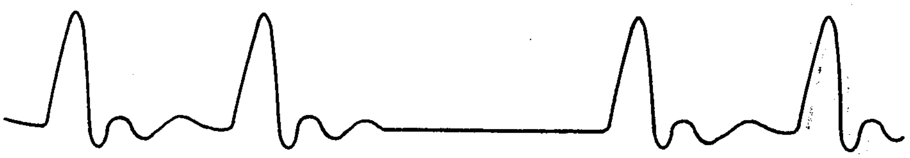
Figure 4:
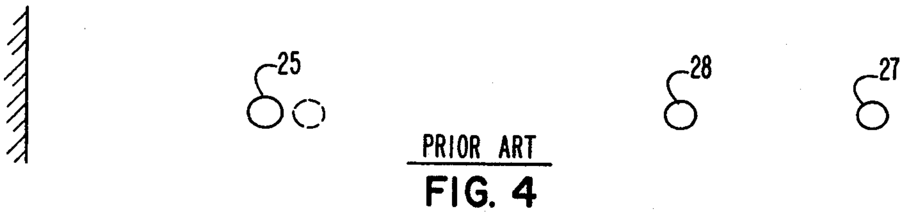
PRIOR ART FIG. 4

As shown in FIG. 2, the prior art drop-on-demand systems utilized a driving pulse to the transducer to produce one drop. As shown on the plot of meniscus motion vs. time (FIG. 3), the meniscus motion must cease before another drop can be reliably produced. The time, $\tau$ min., required for the meniscus to cease motion thus sets the maximum drop production time for the prior art devices and this time produces a typical maximum drop rate in prior art devices of 2–3 thousand drops per second for nozzles producing sufficiently large spots on the print medium. In addition to this limited drop production, prior art devices have produced irregular drops for the first one or more drops after no drops have been produced for some interval. For example, as shown in FIG. 4, drops 27 and 28 are produced with regular spacing in response to voltage drive pulses 29 and 31 respectively. However, at the next interval $S_3$, no drop is to be formed so no drive pulse is produced. At the next interval $S_4$ a pulse is produced, but the resulting drop 25 is irregularly spaced. This irregularity may take the form of drops produced with unequal spacing between drops which, due to the constant head motion, causes the drops to impact the print medium at an unwanted position, which results in the production of poor quality printed data. The irregularity may also take the form of drops of unequal size in addition to the unequal drop spacing which further degrades the print quality.

Figure 5:
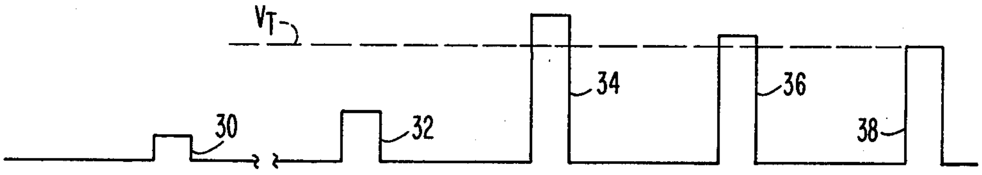
FIG. 5 is a diagram showing the voltage driving pulses for start-up of the drop-on-demand operation in accordance with the present invention.

According to the invention, ink drops are produced with equal size and spacing and at a greatly improved drop rate. This improvement is accomplished by modulating the voltage drive to transducer 24 so that a selected drive voltage is produced at each of the possible drop production times T. The pulse train for control of the start-up sequence in the print head is shown in FIG. 5. The start-up sequence is used at the beginning of operation of the printer and also when two or more intervals pass without the production of drops. Depending on the design of the print head and such factors as the frequency of operation, and characteristics of the ink such as viscosity and surface tension, a steady state threshold voltage $V_t$ can be defined. This voltage $V_t$ is the minimum voltage to transducer 24 that will cause drop ejection during steady state operation of the print head when producing a drop at each possible drop interval T. Prior to start-up, the meniscus is pulsed at a level below the threshold voltage $V_t$ a plurality of times by generating a first pulse 30 with amplitude $V_1$. The amplitude $V_1$ is below the threshold voltage $V_t$ and may range between about 10 and 50 percent of $V_t$, but preferably is about 20 percent of $V_t$ for a specific embodiment. A chosen plurality of pulses of amplitude $V_1$ may be used to pulse the meniscus, and this action aids in producing more uniform drops at a higher drop rate. If desired, the last pulse 32, prior to the formation of the first drop, may be at a higher sub-threshold amplitude $V_m$ at a level up to ninety percent $V_t$, but the preferred level is about 60 percent $V_t$, for example.

The drive pulse 34 produces the first drop in a sequence and the amplitude of this pulse $V_h$ is greater than the threshold voltage $V_t$. The greater amplitude of the drive pulse 34 produces greater energy into transducer 24 to ensure that a drop of the desired size is formed and projected with sufficient velocity to compensate for the additional aerodynamic drag and meniscus dynamics experienced by the first drop following a missing drop. The amplitude depends on the specific design of the print head and can be calculated or determined experimentally. The upper limit of the amplitude of the pulse 34 is determined by a level which will not damage transducer 24 and the preferred range for $V_h$ for the embodiment shown is about twenty to thirty percent higher than threshold voltage $V_t$. The drive pulse 36 for the second drop in the sequence may also be at an amplitude $V_i$ which is higher than the threshold voltage $V_t$ and a typical amplitude for this drive pulse 36 is about ten to twenty percent above the threshold voltage $V_t$. Subsequent drive pulses 38 are at the threshold voltage $V_t$ amplitude.

Figure 6:
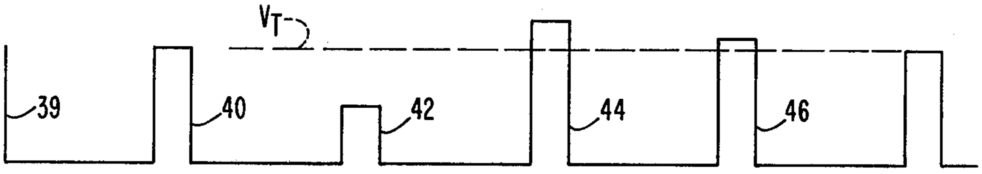
FIG. 6 is a diagram showing the voltage driving pulses during normal operation in accordance with the present invention.

Once the system has been started and reached the steady state operation, drops can be produced at the selected drop rate by driving transducer 24 with a voltage pulse of amplitude $V_t$. One series of drive pulses is shown in FIG. 6 in which the first two drive pulses 39, 40 have an amplitude of $V_t$ to produce drops. However, at the next drop interval, no drop is to be generated so the drive pulse 42 is at a lower level, such as $V_m$. This drive pulse produces meniscus motion but does not produce a drop. The fourth drop time in FIG. 6 shows the production of a drop after a missing drop and this drive pulse 44 is at a level of $V_h$. The fifth drop time in FIG. 6 shows a second drop after a missing drop and this drive pulse 46 is at a level of $V_i$. The remaining drive pulses in FIG. 6 are at a steady state level of $V_t$.

Control means 26 may comprise any suitable means for accepting the print data, which is usually in coded form, generating the bit patterns to produce the print data in the desired font, and producing the drive pulses to control transducer 24 to produce the print data on the record medium. Control means 26 may comprise hard-wired logic or this operation may be provided by the processor of a data processing system of which the printer is a part. In addition, control means may comprise a microcomputer which provides this drive voltage amplitude control as well as other control functions for the printer.

Figure 7:
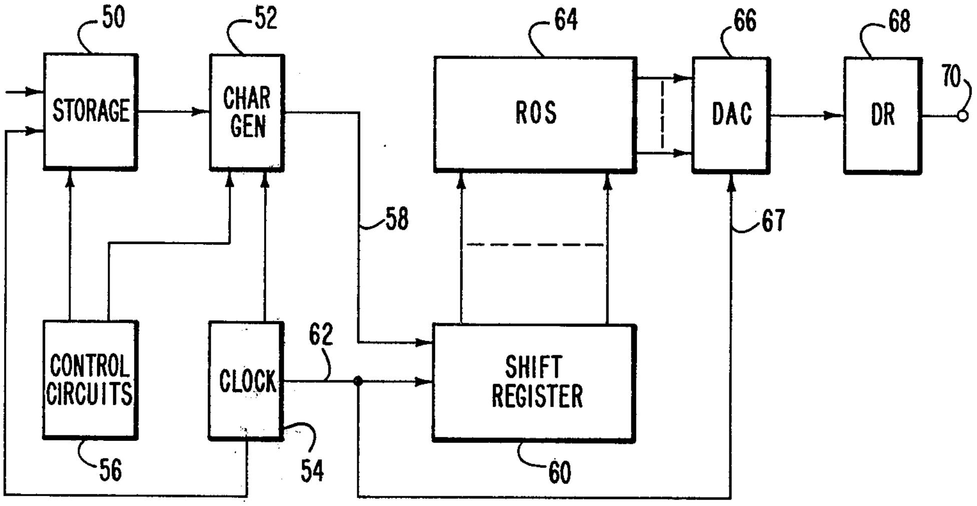
FIG. 7 is a block diagram of one embodiment of the control means for controlling the printer.

Referring to FIG. 7, the embodiment of control means 26 shown comprises a storage device 50, a character generator 52, a clock pulse generator 54, and sequencing control means 56. Storage device 50 functions to store the print data and the desired character fonts. Character generator 52 produces appropriate bit pattern data to produce the print data on the record medium. Clock pulse generator 54 produces timing pulses to define cycles for storage device 50, to define the intervals T and to synchronize other components of the printer. These clock pulses may be derived from a system clock, if desired, which is divided to produce pulses of the desired frequency.

The print data is transmitted to storage device 50 and read out in sequence to character generator 52 under control of signals from sequencing control logic 56 and clock pulse generator 54. A bit stream of print data is transmitted over conductor 58 to the data input terminal of shift register means 60. The number of drops considered in determining the amplitude of a specific drive voltage pulse is a design choice and shift register means 60 has one stage for each drop to be considered in a specific embodiment. Say, for example, that 12 drops in the stream are to be considered and, in this case, shift register means comprises 12 stages. A clock pulse at the chosen drop production rate T is transmitted over conductor 62 to the shift input terminal of shift register means 60. The output of shift register means 60 is loaded in parallel into read only storage device (ROS) 64. Thus, a 12 bit running stream of bit data is transmitted to ROS 64 and this data forms the address for accessing a particular wood in ROS. The amplitude for each drop to be formed is selected in advance for the possible combinations of the 12 bits of drop production data being considered and stored at the location addressed by that bit configuration. The addressed ROS word of 8 bits, for example, at terminal 72 is read out to a digital-to-analog converter (DAC) 66 where it is converted to analog form of a particular amplitude. The output of DAC 66 is coupled under control of a clock pulse on line 67 to driver 68 which forms on terminal 70 the voltage drive signal to drive transducer 24 for the next drop period.

Figure 8:
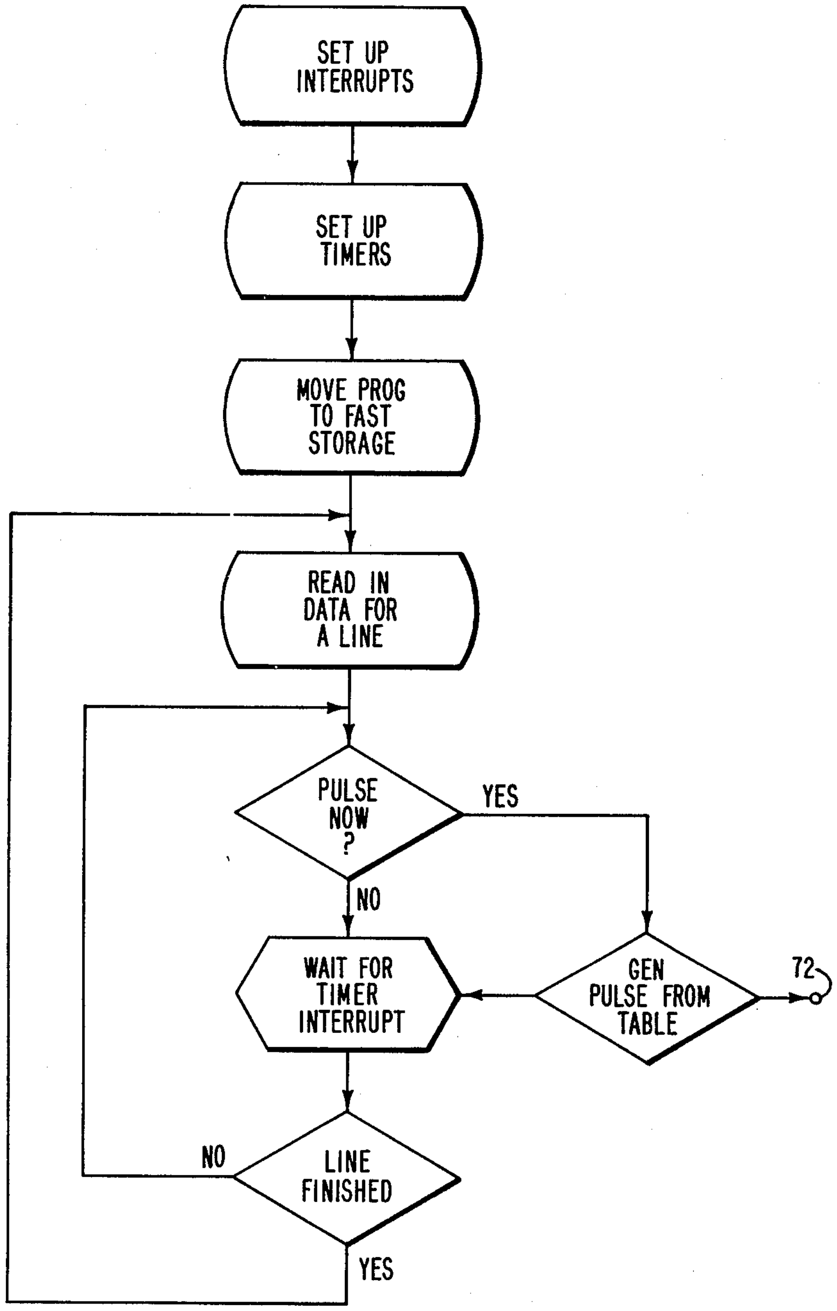
FIG. 8 is a flow chart of an alternate embodiment of the control means for controlling the printer.

Alternatively, the control means 26 may comprise a microcomputer. There are many microcomputers on the market today which are suitable and their operation is well known to those skilled in the art. As shown in FIG. 8, the control utilizing a microcomputer requires the step of determining the number of drops to be considered and setting up tables for the various possible combinations. The system interrupts are set up as well as timers to define the chosen drop generation rate and the program is moved to fast storage for execution.

Data is then read in for one line and the execution utilizes a program loop which first checks to determine whether it is time for a pulse to be produced now. If so, a digital word to define the amplitude of the drive signal is generated by utilizing the bit data to access, by table look-up, the previously prepared table. The digital word on terminal 72 is then transmitted to a DAC, such as DAC 66, to produce the requisite control voltage at a terminal, such as 70, as before.

In both the case in which the time had not elapsed for pulse generation at the time of the check and in the case where a pulse was generated, the operation then proceeds to wait for the timer interrupt which signifies the time for a new interval T to start. A test is made to determine whether the line is complete and, if so, a new line is read in and this loop repeated. In case that the line is not complete, a return to the loop to again check for timing for pulse production, and in this case the answer is yes, so that a pulse is produced as described above.

The voltage modulated control according to the invention produces greatly improved results both in terms of higher drop rate and print quality as compared to prior art devices. For example, a print head similar to that shown in the above-mentioned Demer patent operated in laboratory tests at a drop rate of 2 to 3 thousand drops per second, when operated by prior art driving techniques. The same print head could be operated in laboratory tests at a drop rate of 6–10 thousand drops per second at improved print quality, when operated by voltage modulated control in accordance with our invention. A similar improvement was noted in laboratory tests on print heads of the type shown in the above-mentioned Zoltan patent.

Some techniques have been used in prior art devices to improve the performance of print heads, such as those shown in the Demer and Zoltan patents, by such techniques as impedance matching and control to more quickly dampen meniscus motion. Some of these improved devices have exhibited drop rates up to ten thousand drops per second in laboratory tests, when operated in accordance with the improved prior art techniques. These same print heads, when driven in laboratory tests in accordance with our invention, produced drop-on-demand drop production rates of twenty-five thousand drops per second with superior print quality. Thus, it can be seen that the voltage modulated drive technique comprising our invention produced not only much greater drop-on-demand drop rates, but also better drop synchronization and spacing and, hence, better print quality.

In some cases in which a slightly lower level of improvement can be tolerated, a simplified drive system can be employed. This system utilizes only two levels of drive voltage, a voltage $V_a$ lower than the threshold when no drop is to be produced, and a voltage $V_b$ slightly higher than the threshold when drops are to be produced. The control means is simplified since only two levels of charge are used so no DAC is required.

Having thus described our invention, what we claim as new, and desire to secure by Letters Patent is:

1. A drop-on-demand ink jet printer comprising a selectively actuable print head for selectively projecting drops of ink of substantially uniform size and spacing at a predetermined rate toward a print medium to produce a desired print pattern thereon comprising:

a print head comprising a body member having a cavity with a nozzle portion at one end and a selectively actuable transducer in physical communication with a wall portion of said cavity;

means for supplying ink to said cavity;

voltage pulse means for selectively energizing said transducer to project a drop of ink of predetermined substantially uniform size from said nozzle portion toward a print medium only when said voltage pulse amplitude equals or exceeds a predetermined drive amplitude;

a source of print data; and means for controlling said voltage pulse means in response to said print data to produce drive pulses at a predetermined rate but with selectively variable amplitude; said means for controlling producing a drive pulse at an amplitude lower than said predetermined drive amplitude when no drop is to be ejected and providing a drive pulse at an amplitude equal to or exceeding said predetermined drive amplitude when a first drop of said substantially uniform size is to be ejected following a time at which no drop was ejected.

2. The ink jet printer according to claim 1 wherein said amplitude of said drive pulse, when a first drop is to be ejected following a time at which no drop was ejected, exceeds said predetermined drive amplitude.

3. The ink jet printer according to claim 1 wherein said ink is supplied to said print head by gravity flow.

4. The ink jet printer according to claim 1 wherein said means for controlling comprises storage and character generating circuit means responsive to said print data for selectively energizing said transducer to produce drops to produce print images according to said print data.

5. The ink jet printer according to claim 4 wherein said means for controlling additionally comprises shift register means storing character data for a plurality of successive drops, and means for utilizing said stored shift register data to access an amplitude control signal for said configuration of stored shift register data.

6. The method of marking a record medium with a selectively actuable print head by selectively projecting drops of substantially uniform size and spacing at a predetermined rate toward the print medium to produce a desired print pattern thereon comprising the steps of:

providing a print head comprising a body member having a cavity with a nozzle portion at one end and a selectively actuable transducer in physical communication with a wall portion of said cavity disposed in close proximity to said print medium;

supplying ink to said cavity;

selectively energizing said transducer with voltage pulse means to project a drop of ink of predetermined substantially uniform size from said nozzle portion toward said print medium only when said voltage pulse amplitude equals or exceeds a predetermined drive amplitude;

providing a source of print data; and controlling said voltage pulse means in response to said print data to produce drive pulses at a predetermined rate but with selectively variable amplitude; said controlling step comprising producing a drive pulse at an amplitude lower than said predetermined drive amplitude when no drop is to be ejected and providing a drive pulse at an amplitude equal to or exceeding said predetermined drive amplitude when a first drop of said substantially uniform size is to be ejected following a time at which no drop was ejected.

7. The ink jet printer according to claim 2 wherein said amplitude of said drive pulse, when a second drop is to be ejected following a time at which no drop was ejected, is intermediate the amplitude of said drive pulse for said first drop and said predetermined drive amplitude.

* * * * *